(12) United States Patent
Mierzejewski et al.

(10) Patent No.: US 10,376,998 B2
(45) Date of Patent: Aug. 13, 2019

(54) METHODS AND TOOLS FOR USE IN REPAIRING GAS ENGINE TURBINE BLADES

(71) Applicant: United Technologies Corporation, Hartford, CT (US)

(72) Inventors: Edward Mierzejewski, Broad Brook, CT (US); William Rose, Warren, MA (US)

(73) Assignee: United Technologies Corporation, Farmington, CT (US)

( * ) Notice: Subject to any disclaimer, the term of this patent is extended or adjusted under 35 U.S.C. 154(b) by 502 days.

(21) Appl. No.: 14/754,276

(22) Filed: Jun. 29, 2015

(65) Prior Publication Data

US 2016/0001404 A1 Jan. 7, 2016

Related U.S. Application Data (60) Provisional application No. 62/020,877, filed on Jul. 3, 2014.

(51) Int. Cl.
| | |
|---|---|
| *B23H 1/04* | (2006.01) |
| *B23H 9/10* | (2006.01) |
| *B23P 6/00* | (2006.01) |
| *F01D 5/00* | (2006.01) |
| *F01D 5/20* | (2006.01) |

(52) U.S. Cl.
CPC ............... *B23P 6/002* (2013.01); *B23H 1/04* (2013.01); *B23H 9/10* (2013.01); *B23P 6/007* (2013.01); *F01D 5/005* (2013.01); *F01D 5/20* (2013.01); *F05D 2240/307* (2013.01)

(58) Field of Classification Search
CPC . B23P 6/002; B23P 6/007; B23H 9/10; B23H 1/04; F01D 5/005; F01D 5/20; F01D 2240/307
See application file for complete search history.

(56) References Cited

U.S. PATENT DOCUMENTS

| | | | | |
|---|---|---|---|---|
| 4,197,443 | A * | 4/1980 | Sidenstick | B23H 9/14 219/69.15 |
| 4,441,004 | A * | 4/1984 | Inoue | B23H 1/00 219/69.15 |
| 4,726,104 | A * | 2/1988 | Foster | B23K 35/224 228/118 |
| 4,922,074 | A * | 5/1990 | Sebzda, Sr. | B23H 7/26 219/69.11 |
| 5,183,385 | A * | 2/1993 | Lee | F01D 5/20 415/115 |
| 5,584,663 | A * | 12/1996 | Schell | B23K 26/0853 148/428 |
| 5,893,984 | A * | 4/1999 | Thompson | B23H 9/10 219/69.15 |
| 6,332,272 | B1 * | 12/2001 | Sinnott | B23P 6/002 29/402.08 |

(Continued)

*Primary Examiner* — Jacob J Cigna
(74) *Attorney, Agent, or Firm* — Snell & Wilmer, L.L.P.

(57) ABSTRACT

A repair tool and repair method for restoring gas turbine engine blade tips to a predetermined configuration is provided. The repair tool is an electrode that includes a tool body and a number of pins. The repair tool can be used to repair turbine blade tips through an electrical discharge machining process, such as a ram- or sink-type electrical discharge machining process.

11 Claims, 8 Drawing Sheets

(56) References Cited

U.S. PATENT DOCUMENTS

| | | | |
|---|---|---|---|
| 6,527,514 B2* | 3/2003 | Roeloffs | F01D 5/186 416/97 R |
| 6,754,955 B1* | 6/2004 | Carl, Jr. | B23P 6/007 205/640 |
| 7,204,019 B2* | 4/2007 | Ducotey, Jr. | B23H 9/10 29/402.06 |
| 7,510,376 B2* | 3/2009 | Lee | F01D 5/20 416/97 R |
| 7,591,070 B2* | 9/2009 | Lee | B23P 6/007 29/721 |
| 7,648,341 B2* | 1/2010 | Lau | B23P 6/005 29/402.08 |
| 8,563,889 B2* | 10/2013 | Mohyi Hapipi | B23H 9/10 219/69.15 |
| 2008/0075604 A1* | 3/2008 | Jabado | B23H 3/04 416/241 R |
| 2010/0313405 A1* | 12/2010 | Mohyi Hapipi | B23H 9/10 29/402.07 |
| 2011/0186550 A1* | 8/2011 | Gannelli | B23H 1/04 219/69.1 |
| 2012/0070307 A1* | 3/2012 | Poon | F01D 5/20 416/97 R |
| 2013/0298400 A1* | 11/2013 | Munshi | F01D 5/005 29/889.1 |
| 2014/0131318 A1* | 5/2014 | Luo | B23H 1/024 219/69.13 |
| 2014/0259668 A1* | 9/2014 | Henderson | B23P 6/002 29/889.1 |
| 2015/0190890 A1* | 7/2015 | Ozturk | B23P 6/002 219/69.17 |

\* cited by examiner

FIG. 1

(PRIOR ART)

METHODS AND TOOLS FOR USE IN REPAIRING GAS ENGINE TURBINE BLADES

CROSS-REFERENCE TO RELATED APPLICATIONS

This application is a nonprovisional of, and claims priority to, and the benefit of U.S. Provisional Application No. 62/020,877, entitled "METHODS AND TOOLS FOR USE IN REPAIRING GAS ENGINE TURBINE BLADES," filed on Jul. 3, 2014, which is hereby incorporated by reference in its entirety.

FIELD

The present disclosure relates to gas turbine engine blade tips, and more specifically, to repair of damaged and worn tip pockets of gas turbine engine blades.

BACKGROUND

Conventional gas turbine engine blades frequently utilize squealer or semi-squealer type tip pockets. These tip pockets can include a number of cooling holes. Such tip pockets can become worn, oxidized, or otherwise damaged during operation of the engine. The tip pockets are typically repaired by welding and machining the pocket back to the original shape and configuration. Further, the holes may require laser melting or machining to reopen and reform them to their original configuration. As such, repair tools and methods that reduce the expense and time associated with repairing tip pockets may be desirable.

SUMMARY

A tool for repairing gas turbine engine blades may comprise a tool body comprising a conductive material, wherein the tool body comprises a tool body predetermined shape, the tool body predetermined shape is complementary to a geometry of a tip pocket of a gas turbine engine blade, and a pin comprising a conductive material and coupled to the tool body, wherein the pin comprises predetermined shape complementary to the predetermined geometry of a hole located in the tip pocket.

A method for repairing a gas turbine engine blade tip may comprise adding material to a damaged pocket of a tip of a gas engine turbine blade to form a partially repaired pocket, aligning a repair tool with the partially repaired pocket, wherein the repair tool comprises a tool body comprising a conductive material, wherein the tool body comprises a tool body predetermined shape, the tool body predetermined shape conforming to the partially repaired pocket, and a pin comprising a conductive material and coupled to the tool body, wherein the pin comprises a pin predetermined geometry, the pin predetermined geometry complementary to a predetermined geometry of a hole located in the partially repaired pocket, and repairing the partially repaired pocket by translating the repair tool in the z direction into the partially repaired pocket.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step.

Figure 1:
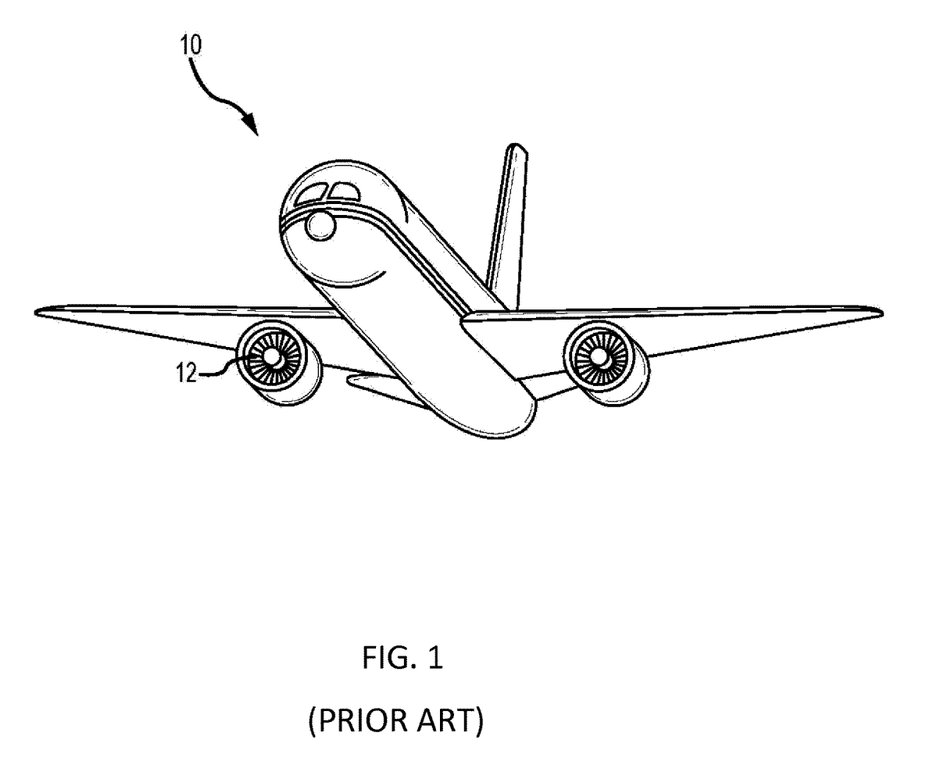
FIG. 1 illustrates a perspective view of an aircraft having a gas turbine engine in accordance with the present disclosure.

With reference to FIG. 1, an aircraft 10 may comprise one or more gas turbine engines 12. Gas turbine engine 12 may provide thrust to aircraft 10. In various embodiments, gas turbine engine 12 comprises a number of turbine blades. As will be discussed further, the scope of the present disclosure includes the repair of any type of turbine blade which is capable of being repaired by the tools and methods disclosed herein.

Figure 2A:
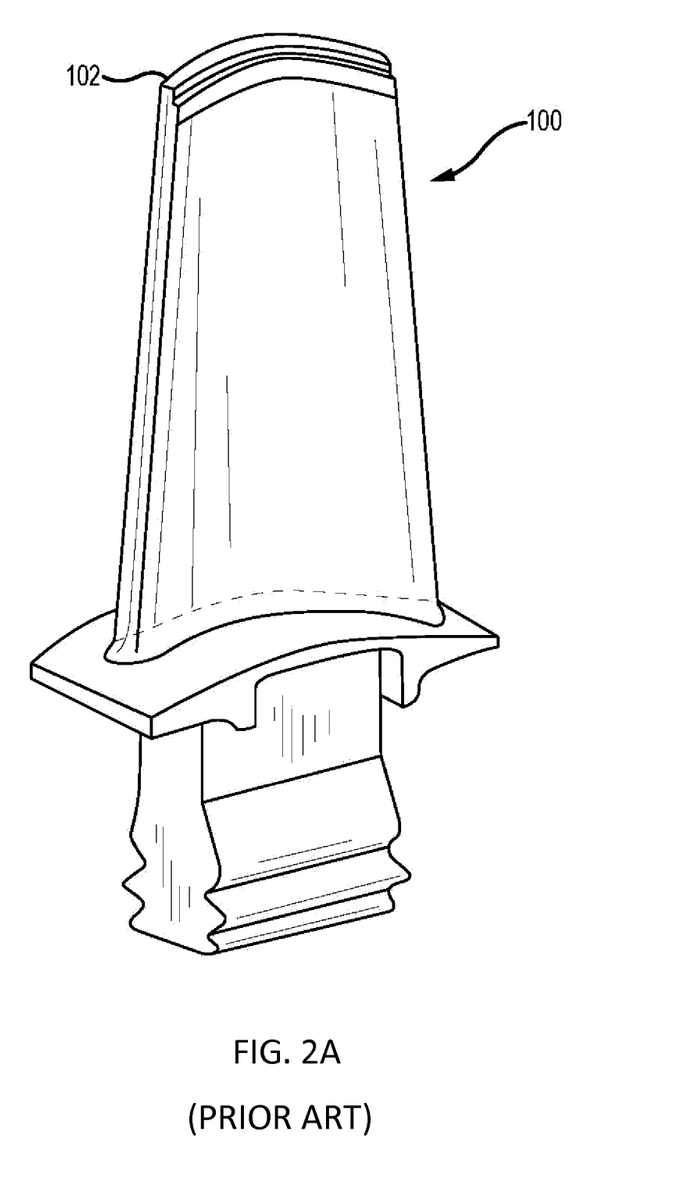
FIGS. 2A and 2B illustrate a perspective view and a partial perspective view, respectively, of a turbine blade in accordance with the present disclosure.
Figure 2B:
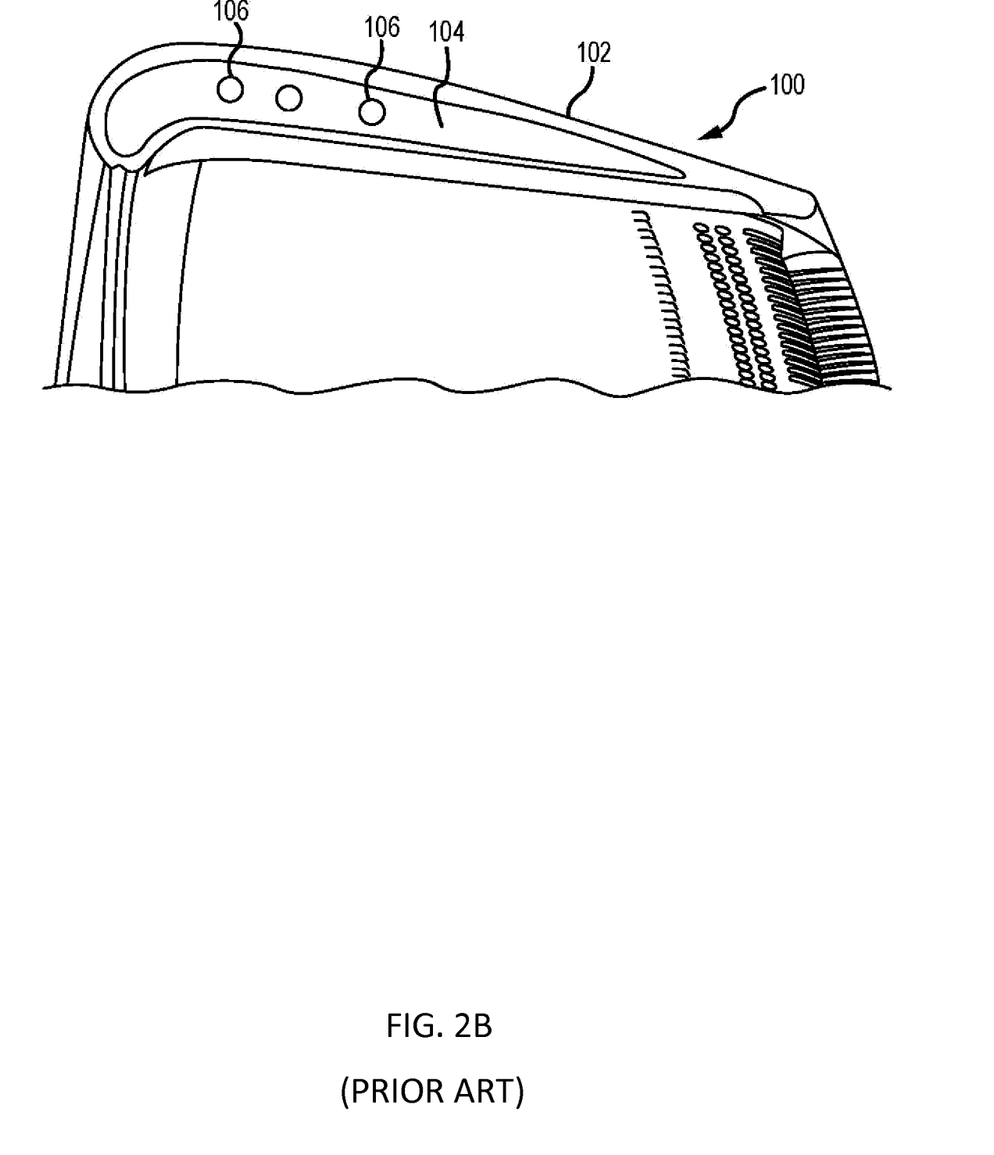

With reference to FIGS. 2A and 2B, a turbine blade 100 is illustrated. In various embodiments, turbine blade 100 is one of a multiplicity of turbine blades within gas turbine engine 12.

In various embodiments, turbine blade 100 may comprise a tip 102. Tip 102 may comprise, for example, a tip pocket 104. For example, tip pocket 104 may comprise a recessed area. In various embodiments, tip 102 comprises a squealer or semi-squealer tip having a squealer tip pocket 104.

In various embodiments, tip pocket 104 comprises one or more holes 106. Holes 106 may be used, for example, to provide additional cooling to blade tip 102. Holes 106 may comprise, for example, holes formed during the manufacturing of turbine blade 100. For example, turbine blade 100 may be cast from a mold, wherein a portion of the mold is anchored by ceramic pins. In such embodiments, holes 106 may correspond with the ceramic anchoring pins. Further, holes 106 may be formed using a casting core.

Figure 3:
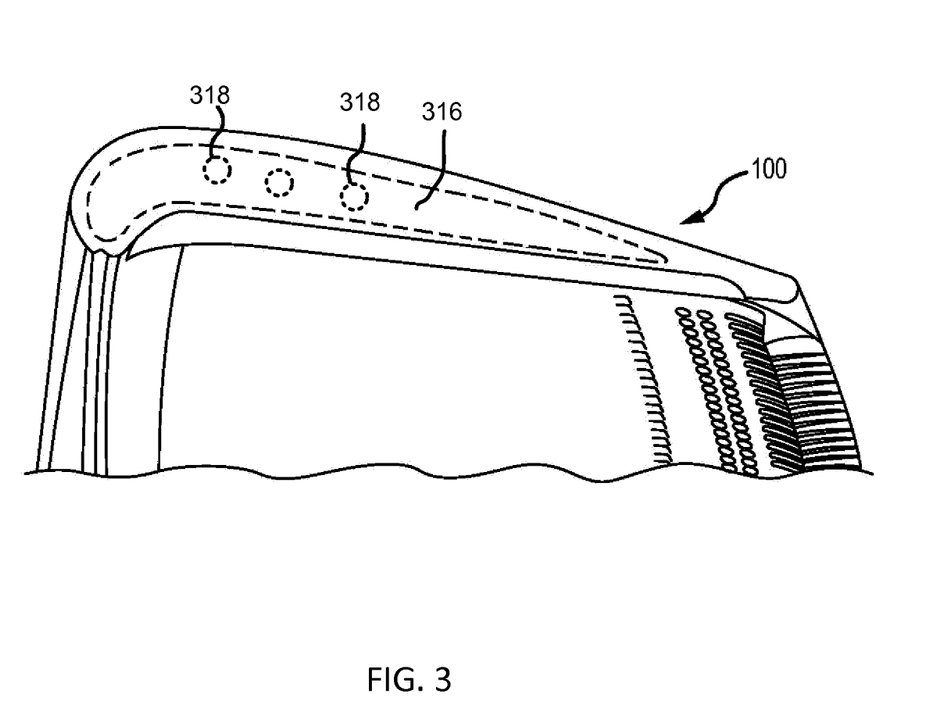
FIG. 3 illustrates a partial perspective view of a damaged turbine blade in accordance with the present disclosure.

With reference to FIG. 3, as turbine blade 100 is in operation, tip 102 may become worn and/or oxidized. Specifically, tip 102 can comprise a damaged pocket 316 that is deformed, misshapen, or otherwise worn. Further, tip 102 can comprise damaged holes 318 that are similarly deformed, distorted, and/or worn as damaged pocket 316. As such, turbine blade 100 may be removed from gas turbine engine 12 to repair damaged pocket 316 and/or damaged holes 318.

Figure 4A:
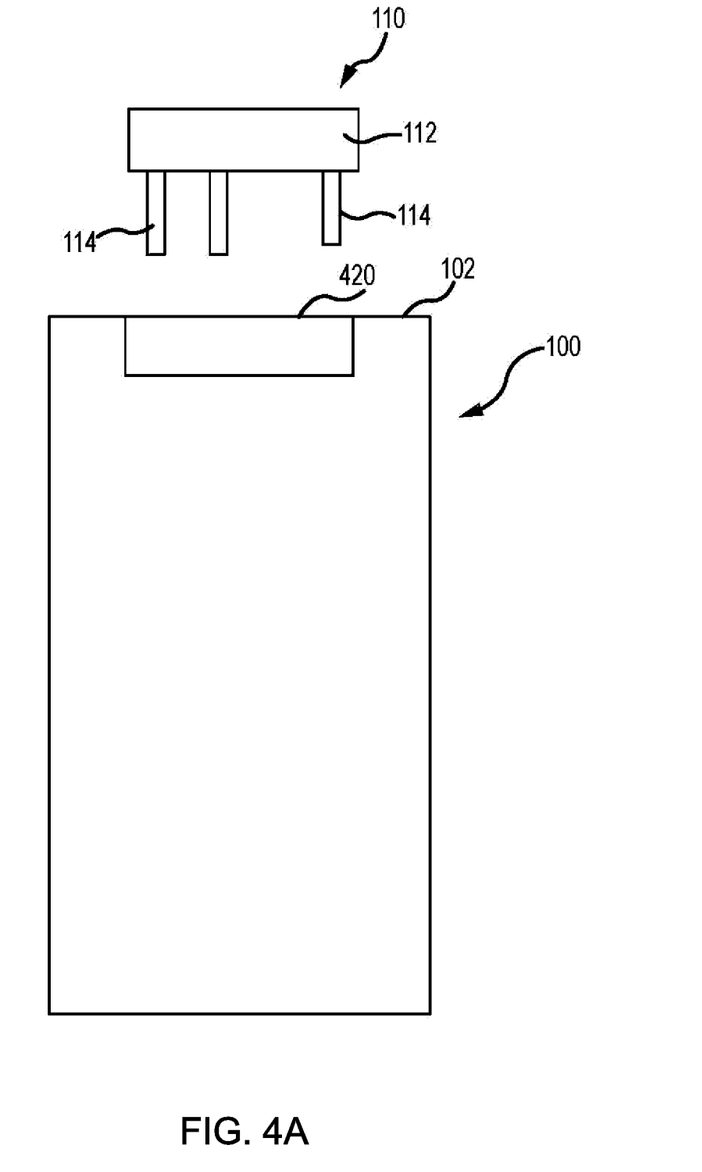
FIGS. 4A and 4B illustrate a side view and a top view, respectively, of a partially repaired turbine blade and a repair tool in accordance with the present disclosure.
Figure 4B:
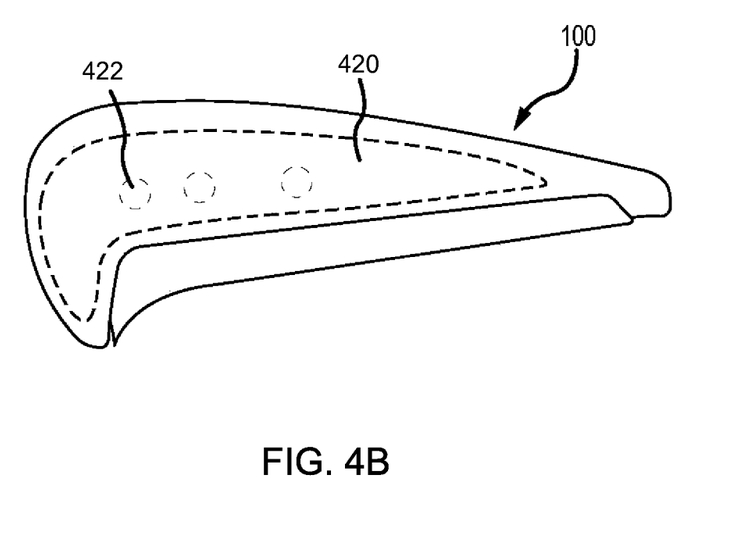

With reference to FIG. 4B, damaged pocket 316 and/or damaged holes 318 can be partially repaired by adding material by, for example, a welding process. For example, welding material in the z direction to damaged pocket 316 can form a partially repaired pocket 420. Similarly, welding material in the z direction to damaged holes 318 can form partially repaired holes 422. In various embodiments, partially damaged pocket 420 and/or partially repaired holes 422 may undergo further repair to restore their original shape and configuration.

With reference to FIG. 4A, a repair tool 110 is illustrated. Repair tool 110 may be used, for example, to repair components of tip 102 including partially repaired pocket 420 and/or partially repaired holes 422. In various embodiments, repair tool 110 may comprise an electrode for use in an electrical discharge machining process to repair partially repaired pocket 420 and/or partially repaired holes 422. As will be discussed further, repair tool 110 may be used in a ram- or sink-type electrical discharge machining process.

In various embodiments, repair tool 110 comprises a tool body 112. Tool body 112 may be configured, for example, to fit within and facilitate repair of partially repaired pocket 420. For example, tool body 112 may be substantially the same shape as a predetermined configuration of pocket 104. Stated another way, tool body 112 may be the same shape as an undamaged pocket 104. However, any shape and configuration of tool body 112 that allows tool body 112 to be placed within partially repaired pocket 420 is within the scope of the present disclosure.

Tool body 112 can comprise a geometry that is complementary to partially repaired pocket 420. For example, at least one surface of tool body 112 can conform to partially repaired pocket 420. In various embodiments, tool body 112 may be electrified during an electrical discharge machining process, and can be lowered into partially repaired pocket 420 to form partially repaired pocket 420 to a desired configuration. In such embodiments, tool body 112 conforms to one or more surfaces of partially repaired pocket 420.

Tool body 112 may comprise, for example, a conductive material which is suitable for use as an electrode in an electrical discharge machining process. For example, conductive materials which are suitable for use in an electrical discharge machining process may include, but are not limited to, copper and graphite. However, the use of any suitable conductive material, including mixtures of conductive materials, is within the scope of the present disclosure.

In various embodiments, repair tool 110 further comprises one or more pins 114. For example, repair tool 110 may comprise one or more pins 114 configured to interact with one or more partially repaired holes 422. Repair tool 110 may comprise, for example, the same number of pins 114 as partially repaired holes 422 of tip 102. In further embodiments, repair tool 110 may comprise fewer pins 114 than partially repaired holes 422.

Pins 114 may comprise, for example, a geometry and/or configuration that are complementary to undamaged holes 106 of tip 102. In various embodiments, pins comprise the same cross sectional geometry (e.g., round or ovoid) as undamaged holes 106. Further, pins 114 may comprise any profile or configuration, including cylindrical and tapered or otherwise non-cylindrical. Any configuration and shape of pins 114 is within the scope of the present disclosure.

For example, pins 114 may comprise a geometry that is complementary to partially repaired holes 422. For example, at least one surface of pins 114 can conform to partially repaired holes 422. In various embodiments, pins 114 may be electrified during an electrical discharge machining process, and can be lowered into partially repaired holes 422 to form partially repaired holes 422 to a desired configuration. In such embodiments, tool body 112 conforms to one or more surfaces of partially repaired holes 422.

Pins 114 may, for example, be configured to be inserted into partially repaired holes 422 to provide proper alignment to repair tool 110. Further, pins 114 may repair and/or restore partially repaired holes 422 to a predetermined shape and configuration. In various embodiments, pins 114 may comprise, for example, a conductive material. Suitable conductive materials include, but are not limited to, copper and graphite. However, the use of any suitable conductive material, including mixtures of conductive materials, is within the scope of the present disclosure.

In various embodiments, pins 114 are integral to tool body 112. For example, tool body 112 and pins 114 may be formed from a single starting component. As such, tool body 112 and pins 114 may be integral to one another. As used herein, the term "integral" means that the various components of repair tool 110 (including tool body 112 and pins 114) are unitary and consist of a single piece. In various embodiments, pins 114 and tool body 112 are cast as one piece. In such embodiments, pins 114 and tool body 112 may comprise the same conductive material.

In various embodiments, pins 114 are formed separately from the tool body 112 and then suitably coupled to tool body 112, and are therefore non-integral. For example, pins 114 may comprise a threaded portion configured to engage with a complementarily threaded portion of tool body 112. Pins 114 may also be removably coupled to tool body 112 by non-threaded means, such as, for example, press fitting and/or interference fitting. Any manner of coupling pins 114 and tool body 112 is within the scope of the present disclosure. Further, pins 114 may comprise the same or different material as tool body 112.

Figure 5:
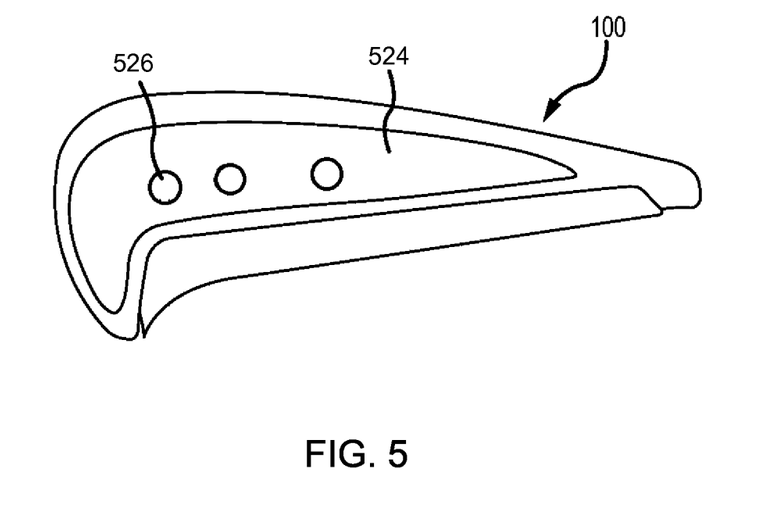
FIG. 5 illustrates a top view of a repaired turbine blade in accordance with the present disclosure.

With reference to FIG. 5, a tip 102 comprising a restored pocket 524 and restored holes 526 is illustrated. In various embodiments, restored pocket 524 and restored holes 526 comprise the same geometries and configurations as undamaged pocket 104 and undamaged holes 106. In further embodiments, restored pocket 524 and/or restored holes 526 comprise geometries and configurations that are within suitable tolerance of the geometries and configurations of undamaged pocket 104 and undamaged holes 106. Stated another way, restored pocket 524 and restored holes 526 may be restored to geometries and configurations that are nearly the same as, but not identical to, undamaged pocket 104 and undamaged holes 106.

Figure 6:
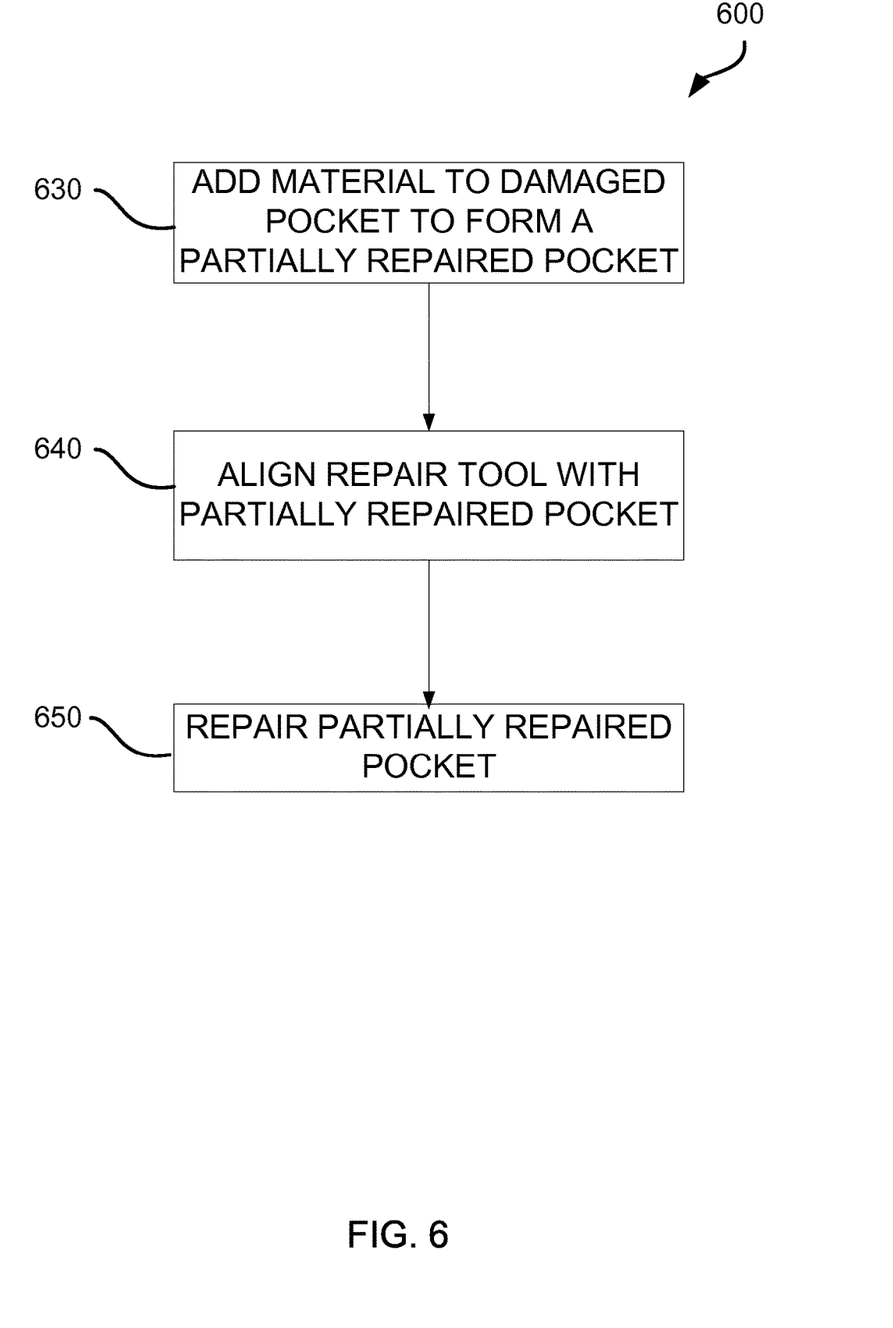
FIG. 6 is a process flow diagram for repairing a turbine blade in accordance with various embodiments.

In various embodiments and with reference to FIG. 6, a method 600 for repairing a tip of a gas engine turbine blade may comprise a step 630 of adding material to a damaged pocket to form a partially repaired pocket. For example, step 630 may comprise providing a turbine blade 100 that would benefit from repair of a damaged pocket, such as damaged pocket 316 and/or damaged holes 318. As previously discussed, damaged pocket 316 and/or damaged holes 318 may be deformed, worn, or otherwise damaged during operation of gas turbine engine 12. In various embodiments, step 630 comprises adding material to damaged pocket 316 and damaged holes 318 to form a partially repaired pocket 420. Adding material to damaged pocket 316 may comprise, for example, depositing metal to damaged pocket 316 in the z-direction through a welding process. Any suitable process for adding material to damaged pocket 316 to form a partially repaired pocket 420 is within the scope of the present disclosure.

In various embodiments, partially repaired pocket 420 may be further repaired in subsequent steps to restore partially repaired pocket 420 and/or partially repaired holes 422 to predetermined configurations. For example, method 600 may further comprise a step 640 of aligning a repair tool with a partially repaired pocket. In various embodiments, step 640 comprises using a repair tool such as repair tool 110 to repair partially repaired pocket 420. As previously discussed, repair tool 110 may comprise one or more pins 114 configured to align with and enter one or more partially repaired holes 422. Step 640 may comprise, for example, aligning repair tool 110 such that one or more pins 114 are positioned relative to partially repaired holes such that they may be translated in the z direction to enter one or more partially repaired holes 422, thereby property orienting and aligning repair tool 110 within partially repaired pocket 420 of turbine blade 100.

In various embodiments, method 600 comprises a step 650 of repairing the partially repaired pocket. For example, repair tool 110 may be used to restore the shape and configuration of partially repaired pocket 420 and/or partially repaired holes 422 to a predetermined shape and configuration. In various embodiments, step 650 comprises using a properly aligned repair tool 110 as an electrode in a ram- or sink-type electrical discharge machining process. In such embodiments, electricity is passed through repair tool 110 and a dielectric fluid (such as, for example, oil or water) as repair tool 110 is lowered into partially repaired pocket 420 and/or partially repaired holes 422. The current causes material to be removed from partially repaired pocket 420 and/or partially repaired holes 422 in a highly localized area. For example, repair tool 110 is energized and slowly inserted into partially repaired pocket 420 and/or partially repaired holes 422 until partially repaired pocket 420 and/or partially repaired holes 422 are restored to the predetermined shape and configuration.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for repairing a gas turbine engine blade tip comprising:
    adding material to a damaged pocket of a tip of a gas engine turbine blade to form a partially repaired pocket;
    adding material to a damaged hole of the tip of the gas engine turbine blade to form a partially repaired hole;
    inserting a pin of the repair tool into the partially repaired hole, wherein the repair tool comprises a tool body comprising a conductive material, wherein the tool body comprises a tool body predetermined shape, wherein the tool body predetermined shape is substantially the same shape as the partially repaired pocket, wherein the pin comprises a conductive material and is coupled to the tool body, wherein the pin comprises a pin predetermined geometry, the pin predetermined geometry complementary to a geometry of the partially repaired hole; and
    repairing the partially repaired pocket by translating the repair tool in the z direction into the partially repaired pocket and the partially repaired hole, wherein a portion of the tool body is placed at least partially within the partially repaired pocket.

2. The method of claim 1, wherein the step of repairing the partially repaired pocket comprises using at least one of a ram or sink type electrical discharge machining process.

3. The method of claim 1, wherein the step of adding material to the damaged pocket comprises welding in the z direction.

4. The method of claim 1, wherein the tool body comprises at least one of graphite or copper.

5. The method of claim 1, wherein the pin comprises at least one of graphite or copper.

6. The method of claim 1, wherein the repair tool comprises an equal number of pins as holes in the damaged pocket.

7. The method of claim 1, wherein the pin and the tool body are integral.

8. The method of claim 1, wherein the pin is cylindrical.

9. The method of claim 1, wherein the predetermined geometry of a hole is the geometry of an undamaged hole in an undamaged tip pocket.

10. The method of claim 1, wherein the pin is removably coupled to the tool body.

11. The method of claim 10, wherein the pin is threaded and the tool body comprises a thread pattern that is complementary to the threaded pin.

\* \* \* \* \*